United States Patent [19]

Odaka et al.

[11] Patent Number: 4,866,590

[45] Date of Patent: Sep. 12, 1989

[54] SUPPLY HAVING A LOAD INVARIANT AUXILIARY POWER SUPPLY SUPPLIED FROM A MAIN TRANSFORMER AND A CURRENT SUPPRESSING INDUCTOR

[75] Inventors: Teruaki Odaka; Kunio Ishiyama, both of Mobara; Shoichi Noguchi, Chiba, all of Japan

[73] Assignee: Hitachi, Ltd., Tokyo, Japan

[21] Appl. No.: 225,393

[22] Filed: Jul. 28, 1988

[30] Foreign Application Priority Data

Sep. 18, 1987 [JP] Japan .................. 62-232244
Sep. 18, 1987 [JP] Japan .................. 62-232245

[51] Int. Cl.⁴ .................. H02M 3/335; H02M 7/5375
[52] U.S. Cl. .................. 363/49; 219/10.55 B; 363/20; 363/131
[58] Field of Search .................. 363/20, 21, 49, 131; 328/258, 270; 219/10.55 B

[56] References Cited

U.S. PATENT DOCUMENTS 4,724,291  2/1988  Inumada .................. 219/10.55 B

FOREIGN PATENT DOCUMENTS 163949  10/1982  Japan .
172978  10/1983  Japan .................. 363/49
98871   6/1985  Japan .................. 363/131
39859   2/1986  Japan .
39867   2/1986  Japan .
211986  9/1986  Japan .
16074   1/1987  Japan .

OTHER PUBLICATIONS

"Denshi Gijutsu", pp. 92, 93, Mar. 1988.
Hoffman, "Self-Generated Bias Supply," IBM Tech. Discl. Bul., vol. 20, No. 5, pp. 1814–1815, Oct. 1977.
Palmucci, "Switching Regulator Start-Up Circuit," IBM Tech. Discl. Bul., vol. 19, No. 3, pp. 978, 979, Aug. 1976.

Primary Examiner—William H. Beha, Jr.
Attorney, Agent, or Firm—Antonelli, Terry & Wands

[57] ABSTRACT

Disclosed is a switching power source having a series connection composed of a main transformer, a current-suppressing inductance element, and a switching element and connected across a DC input power source, in which output windings are additionally wound on the main transformer and the inductance elements respectively and those output windings are connected in series to each other so as to form an auxiliary power source for a control circuit for driving/controlling the ON-OFF of the switching element, and a starting circuit is provided to supply power from the DC input power source to the control circuit only during the starting time of the switching power source.

7 Claims, 5 Drawing Sheets

SUPPLY HAVING A LOAD INVARIANT AUXILIARY POWER SUPPLY SUPPLIED FROM A MAIN TRANSFORMER AND A CURRENT SUPPRESSING INDUCTOR

BACKGROUND OF THE INVENTION

The present invention relates to a switching power source, and particularly relates to a switching power source of the type in which an auxiliary power source is obtained from a main transformer.

In a switching power source of the type in which an auxiliary power source is obtained from a main transformer of the switching power source, a control circuit or the like for driving and controlling the ON-OFF operation of a switching element cannot be actuated when starting the switching power source because no auxiliary power source voltage is generated. Accordingly, the power source of this type requires means for making an auxiliary power source voltage rise when starting the switching power source.

Figure 1:
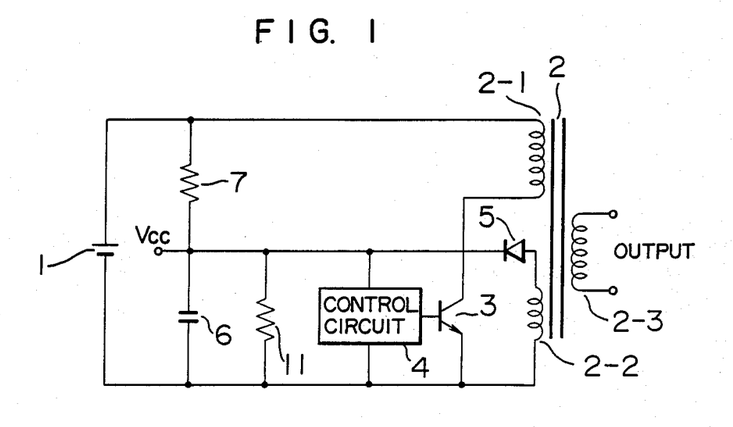
FIG. 1 is a circuit diagram showing an example of a switching power source of the type in which an auxiliary power source is obtained from a main transformer.

For example, as shown in FIG. 1, a voltage divider circuit constituted by resistors 7 and 11 is connected to a DC input power source 1 so that an auxiliary power source smoothing capacitor 6 is charged by the voltage divider circuit so as to make an auxiliary power source voltage Vcc rise. The circuit of FIG. 1 is further provided with a transformer 2, a main switching element 3, and a control circuit 4, an auxiliary power source rectifier diode 5. The transformer 2 is provided with a primary winding 2-1, a secondary winding 2-2 for the auxiliary power source, and a secondary winding 2-3 for output. The output secondary winding 2-3 is connected to a rectifying/smoothing circuit (not shown) so as to supply DC output power to a load (not shown). An output voltage of the rectifying/smoothing circuit is fed back to the control circuit 4 and compared with a reference voltage provided in the control circuit 4. The control circuit 4 controls the switching operation of the main switching element 3 so as to make an error between the compared output and reference voltages zero. The DC input power source 1 may be obtained by rectifying and smoothing a commercial AC power source.

Further, as disclosed, for example, in JP-A-No. 61-211986, known is a switching power source provided with a starting circuit in which a voltage of a DC input power source obtained by rectifying/smoothing a commercial AC power source is divided by capacitors (practically, a resistor is connected in parallel to each of the capacitors) so as to supply a voltage to a circuit for driving the ON-OFF operation of switching elements of an invertor circuit (that is, a circuit for amplifying an output of a control circuit to thereby directly drive the ON-OFF of switching elements of an invertor circuit). The JP-A-No. 61-211986 describes that by using such a starting circuit the switching power source can be made smaller in size and lower in cost than the conventional switching power source in which an output of a transformer for a control circuit connected directly to a commercial AC power source is rectified so as to be used not only for the control circuit but for starting the above-mentioned circuit for driving the ON-OFF of the switching element.

In the latter prior art, however, there is a problem in that although the control circuit can be started by a voltage obtained by the divider circuit to thereby make an auxiliary power source rise, the voltage is kept applied to the divider circuit even after the rise of the auxiliary power source, resulting in power loss.

In the case of the circuit shown in FIG. 1, there is a problem. Since the auxiliary power source is arranged so as to be supplied by the transformer winding 2-2 after starting, it is necessary to make the quantity of charge by the resistor 7 small in advance. To this end, the value of the resistor 7 is selected to be large. On the other hand, the smoothing capacitor 6 is selected to have a large capacitance in order to make the auxiliary power source voltage Vcc stable. Accordingly, the charging time of the smoothing capacitor 6 in starting is so long that it takes a long time before the switching operation is started. Further, in the case where the switching power source as shown in FIG. 1 is used as a power source for a load such as a magnetron, in which a load voltage varies in accordance with the operational conditions, there is a problem in that the auxiliary supply voltage varies in proportion to the variation of the load voltage.

SUMMARY OF THE INVENTION

A first object of the present invention is to provide a switching power source of the type in which an auxiliary power source having little power loss and requiring little time for starting is obtained from a main transformer.

A second object of the present invention is to provide a switching power source of the type in which an auxiliary power source is supplied by a main transformer, the auxiliary power source being produced stably against variations in a load voltage even in the case where the switching power source is used as a power source for a load in which the load voltage varies in accordance with the operational conditions.

In order to attain the first object, according to a first aspect of the present invention, in a switching power source of the type in which there is a series connection of an input winding of a transformer and a main switching element, the ON-OFF operation of which is driven and controlled by a control circuit is connected to a DC input power source, and in which a winding for an auxiliary power source is provided on the transformer so that an output voltage of the auxiliary power source winding is rectified and smoothed so as to be used as a power source for the control circuit, a starting circuit with a resistor connected thereto in series is provided to subsidiary switching element which is controlled in a closed state when starting the switching power source so that, power is supplied during starting from the DC input power source to the control circuit through the starting circuit.

The starting circuit completes its object when the current caused to flow into the input winding of the transformer becomes a high-frequency current by the ON-OFF operation of the main switching element and the output voltage of the auxiliary power source winding provided on the transformer becomes large. Then, the subsidiary switching element of the starting circuit is made open so as to prevent a current from flowing into the starting circuit when existence of an ON-OFF driving signal for the main switching element owing to the state of oscillation of the control circuit is detected or when an excess of the auxiliary power source voltage applied to the control circuit over a predetermined value is detected.

According to the arrangement as described above, it is possible to eliminate the problem that a current is allowed to flow indefinitely into the starting circuit even after the high-frequency current has been caused to flow into the input winding of the transformer to thereby make the output of the auxiliary winding of the transformer rise to establish the operation of the switching power source. Thus, the loss caused by the starting circuit can be eliminated. Further, it is possible to make the starting time short by making a considerably large current flow into the starting circuit, because the starting circuit is kept in an OFF-state except for the time when it is operated for a short time only during starting, and the starting circuit has no relation to power loss or the like during continuous use of the arrangement.

In order to attain the above second object, in a switching power source according to a second aspect of the present invention, there are additionally provided several turns of output windings on a main transformer and an inductance element connected in series to each other so as to be used as an auxiliary power source for a control circuit for driving and controlling the ON-OFF of a switching element. Although the output voltage generated in the auxiliary power source winding wound on the main transformer varies in proportion to a load voltage, the output voltage generated in the auxiliary power source winding wound on the inductance element varies reversely such that the output voltage becomes low when the load voltage becomes high, while the output voltage becomes high when the load voltage becomes low. Accordingly, if the two auxiliary power source windings are connected in series to each other so that the output voltages generated respectively in those auxiliary power source windings are added to each other, a substantially constant voltage having no relation with the load voltage is obtained. Thus, an auxiliary power source for producing a stable voltage for the control circuit can be obtained even if no transformer is provided exclusively for the auxiliary power source.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Referring to the drawings, embodiments of the present invention will be described hereunder. In all the drawings, the same members or parts are referenced correspondingly, and description of them will not be repeated if unnecessary.

Figure 2:
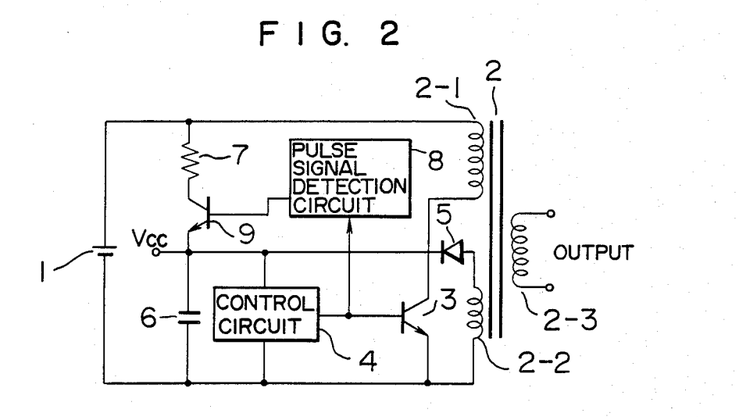
FIG. 2 is a circuit diagram showing a first embodiment of the present invention.

FIG. 2 is a circuit diagram showing a first embodiment of the present invention, in which a series connection of a primary input winding 2-1 of a transformer 2 and a main switching element 3 is connected between the terminals of a DC input power source 1, and a control circuit 4 for driving the ON-OFF of the main switching element 3 is connected to the main switching element 3, the control circuit 4 being actuated to operate by a voltage Vcc of an auxiliary power source. A secondary winding 2-2 additionally provided in the transformer 2 for the auxiliary power source is connected to a smoothing capacitor 6 through a rectifier diode 5 so that the DC auxiliary power source voltage Vcc is generated across the smoothing capacitor 6. A resistor 7 and a subsidiary switching element 9 are connected in series to each other between the positive terminal of the DC input power source 1 and the terminal of the auxiliary power source Vcc, and a pulse signal detection circuit 8 is connected to the subsidiary switching element 9 to control the ON-OFF state of the latter. The pulse signal detection circuit 8 for detecting whether the main switching element 3 has started to operate or not is connected to an output terminal of the control circuit 4 so as to determine the existence of a pulse signal. The pulse signal detection circuit 8 makes the subsidiary switching element 9 off upon detection of a pulse signal while making the subsidiary switching element 9 on upon no detection of a pulse signal. An output winding 2-3 of the transformer 2 is connected to a load so as to supply power to the load directly or through a not-shown rectifier and smoothing circuit. A switching power source is often used because AC power of a frequency higher than a commercial AC power source can be easily generated so as to reduce a transformer in size and weight, and supply power can be easily adjusted through a control circuit. Generally, a DC input power source is provided by rectifying and smoothing a commercial AC power source.

Figure 3:
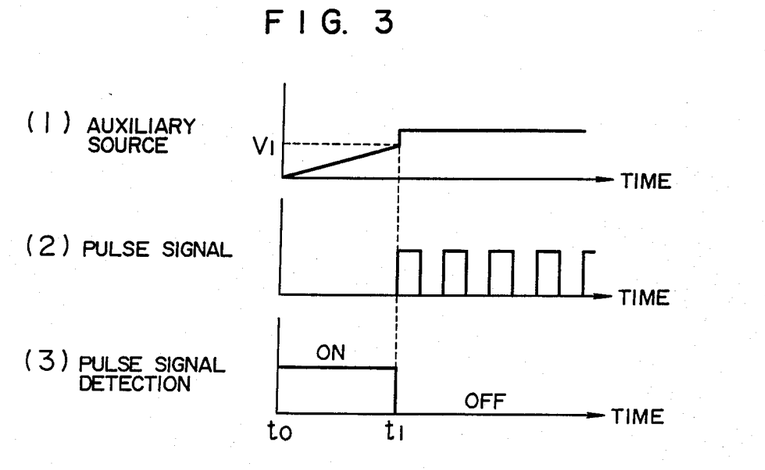
FIG. 3 is a view for explaining the operation of the first embodiment.

FIG. 3 is a timing chart for explaining the operation of the embodiment described above. When a power source is turned on at a point of time $t_0$, the auxiliary power voltage Vcc is in the state near zero as shown in the diagram (1) of FIG. 3, so that the control circuit 4 can not perform its normal operation and can not send a pulse signal to the main switching element 3 as shown in the diagram (2) of FIG. 3. In a certain period following the point of time $t_0$, the pulse signal detection circuit 8 does not detect any pulse signal and sends an ON-signal to the subsidiary switching element 9 to make the subsidiary switching element 9 on as shown in the diagram (3) of FIG. 3 so as to allow a charging current to flow into the smoothing capacitor 6 through the resistor 7. When the charge has progressed so that the voltage across the capacitor 6 reaches a value V1 at which the control circuit 4 can perform its normal operation at a point of time $t_1$ as in the diagram (3) of FIG. 3, the control circuit 4 sends out a pulse signal as shown in the diagram (2) of FIG. 3. Upon detecting the pulse signal, the pulse signal detection circuit 8 sends an OFF-signal to the subsidiary switching element 9 to make the subsidiary switching element 9 off so as to stop the charging of the auxiliary power source through the resistor 7. After the point of time $t_1$, in the auxiliary power source, the AC voltage generated at the auxiliary power source secondary winding 2-2 of the transformer 2 is rectified by the rectifier diode 5 and the rectified voltage is smoothed by the smoothing capacitor 6, so that the smoothed voltage is supplied as an auxiliary power source voltage.

As described above, the resistor 7 provided in a starting circuit actually operates only for a short time in starting, so that a power loss consumed in the resistor 7 is suppressed. Further, if the value of the resistor 7 is made small so as to shorten the starting time, the auxiliary power source voltage becomes abnormally high in the case where the starting resistor 7 is kept connected. In this embodiment, however, the starting circuit is made off by the subsidiary switching element 9 when the main switching element 3 has started its ON-OFF operation, so that the problem as described above does not occur, and therefore the resistor 7 can be set to a relatively small value to thereby shorten the starting time.

Being illustrated as a bipolar transistor in FIG. 2, each of the main and subsidiary switching elements may be any other switching element, such as an FET, a thyristor, or the like. Further, being shown in the form of a half-wave rectifying system, the rectifier circuit of the auxiliary power source may be of any other system, such as a full-wave rectifier system, a voltage multiplying rectifier system, or the like.

Figure 4:
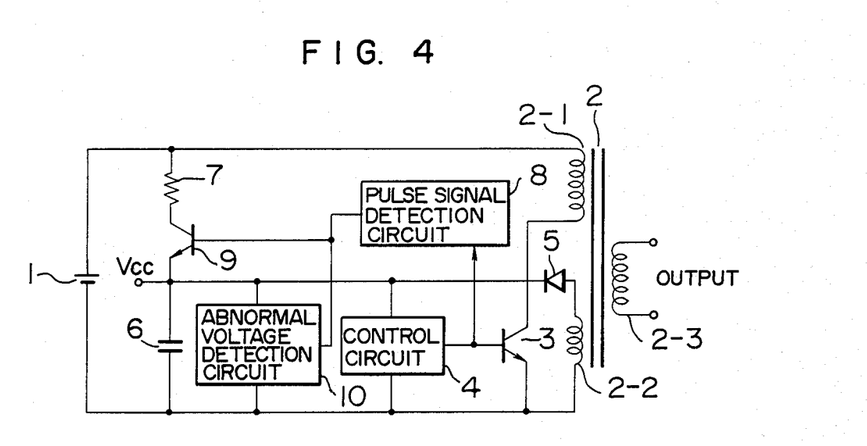
FIG. 4 is a circuit diagram of a second embodiment of the present invention.

FIG. 4 is a circuit diagram showing a second embodiment of the present invention, in which a protective function against an abnormal voltage, that is, an abnormal-voltage detection circuit 10 is added to the first embodiment.

In the second embodiment, the abnormal voltage detection circuit 10 is connected to an auxiliary power source Vcc so that the subsidiary switching element 9 is turned off in response to a detection signal of the abnormal-voltage detection circuit 10. The operation of the other parts is the same as that of the first embodiment, and the description of the operation will be omitted.

Figure 5:
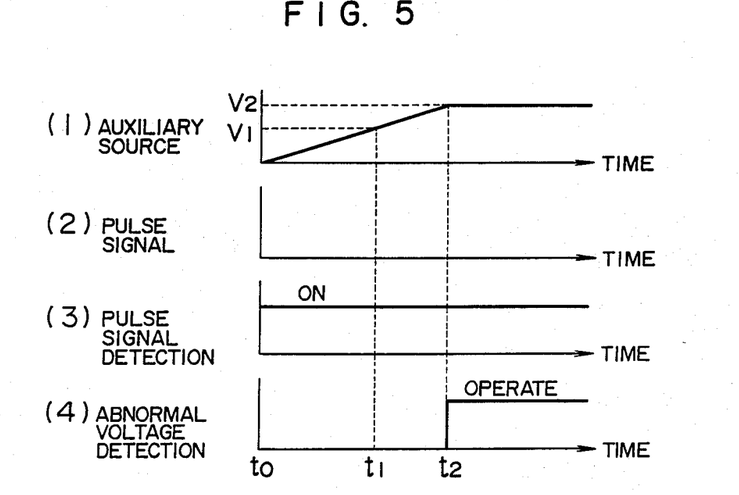
FIG. 5 is a view for explaining the operation of the second embodiment.

FIG. 5 is a timing chart for explaining the operation of the second embodiment and shows the operation in the case where the control circuit 4 can not send any pulse signal for some reason or other. When a power source is turned on at a point of time $t_0$, a pulse signal detection circuit 8 does not detect any pulse signal and the abnormal voltage detection circuit 10 does not detect any abnormal voltage, so that the subsidiary switching element 9 is controlled to be in an ON-state and the capacitor 6 is charged through the starting circuit to raise the auxiliary power source voltage Vcc as shown in the diagram (1) of FIG. 5. The control circuit 4 should essentially produce a pulse signal at a point of time $t_1$. In the case where the control circuit 4 can not produce any pulse signal at that point of time $t_1$ for some reason as shown in the diagram (2) of FIG. 5, the pulse signal detection circuit 8 continues to send an ON-signal to the subsidiary switching element 9 as shown in the diagram (3) of FIG. 5. As a result, the auxiliary power source voltage continuously rises even after the point of time $t_1$ as shown in the diagram (1) of FIG. 5. Generally, the control circuit 4 is constituted by low withstanding voltage elements, and therefore, if the auxiliary power source voltage becomes abnormally high, there is the risk of damaging the control circuit by an excess in dielectric strength. In this embodiment, however, the additionally provided abnormal voltage detection circuit 10 detects existence of an abnormal voltage when the auxiliary power source voltage reaches a predetermined high voltage $V_2$ at a point of time $t_2$. Then, the abnormal voltage detection circuit 10 produces an OFF signal for forcibly turning the subsidiary switching element 9 off so as to cut off the starting circuit after the point of time $t_2$ as shown in the diagram (4) of FIG. 5. Thus, in this second embodiment, the control circuit can be prevented from completely breaking down even in the case where the control circuit 4 can not send any pulse signal for some reason.

Figure 6:
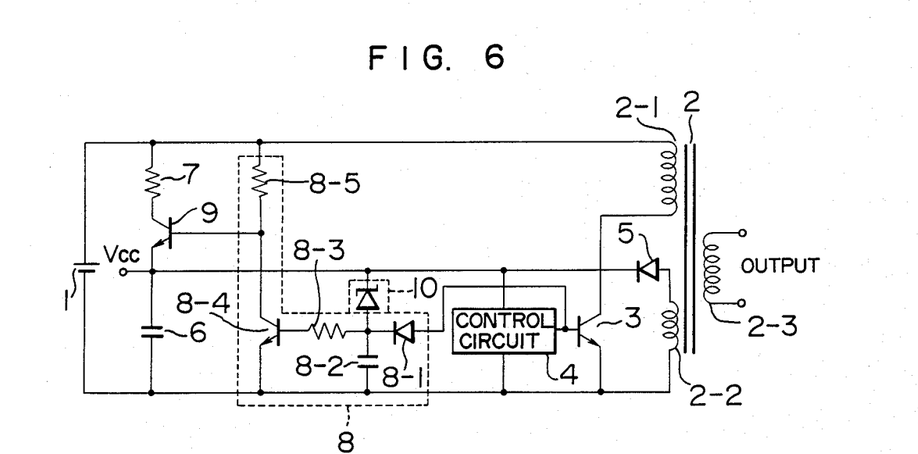
FIG. 6 is a specific circuit diagram of a third embodiment of the present invention.

FIG. 6 shows a third embodiment of the present invention. Being basically the same as the second embodiment, the third embodiment is an example in which the pulse signal detection circuit 8 and the abnormal voltage detection circuit 10 are represented specific circuit parts. The pulse signal detection circuit 8 is constituted by a diode 8-1, a capacitor 8-2, a resistor 8-3, a transistor 8-4, and a resistor 8-5, and the abnormal voltage detection circuit 10 is constituted by a Zener.

The operation of the thus arranged circuit will be described hereunder. At the moment when the power source is turned on, the control circuit 4 can not operate to send out any pulse signal, so that the diode 8-1 and the transistor 8-4 are in an OFF-state. A base current is therefore caused to flow into the subsidiary switching element 9 through the resistor 8-5, so that the subsidiary switching element 9 is turned on so as to charge the smoothing capacitor 6 through the resistor 7. When the smoothing capacitor 6 has been charged so as to raise the auxiliary power source voltage Vcc to a predetermined value, the control circuit 4 is enabled to produce a pulse signal. When the pulse signal is produced, the diode 8-1 forms a rectifier circuit in cooperation with the capacitor 8-2, so that a voltage is stored across the capacitor 8-2. The stored voltage makes a current flow into the transistor 8-4 through the resistor 8-3 so as to turn the transistor 8-4 on. Accordingly, the subsidiary switching element 9 is turned off so that the charging of the capacitor 6 through the resistor 7 is stopped. Thereafter, the AC voltage generated at the auxiliary power source winding 2-2 of the transformer 2 is supplied to the auxiliary power source through the rectifier diode 5. Since the resistor 8-5 connected across the DC input power source 1 in the form of a series circuit with the transistor 8-4 can be set to a large value, the power consumption in the series circuit of the transistor 8-4 and the resistor 8-5 in operation of the switching power source can be made extremely small.

On the other hand, in the case where no pulse signal is produced from the control circuit 4 for some reason, the Zener diode of the abnormal voltage detection circuit 10 (the voltage value of the Zener diode is previously set to a desired value at which the control circuit 4 is not damaged) is actuated voltage at which the control circuit 4 is not negatively influenced by the auxiliary power source voltage, so that the transistor 8-4 is turned on. As a result, the subsidiary switching element 9 is turned off, and the auxiliary power source voltage Vcc is prevented from rising to an abnormally high value.

As described above, according to the present invention, the starting circuit operates only starting of the power source, so that power consumption can be minimized, efficiency can be improved, and rising time in starting can be shortened. Further, the starting circuit has a function of preventing the auxiliary power source voltage from rising to an abnormally high value.

An example of the effect of the foregoing embodiments will be shown by use of numerical values. When resistors of rated power of 2 W were used as the resistors 7 in FIGS. 1 and 6 respectively, the starting time in the power source of FIG. 1 was about 1.5 seconds, while that of FIG. 6 was about 50 milliseconds. The power loss in the starting circuit in the power source of FIG. 1 was a degree required in continuous use of a resistor of rated power of 2 W. On the other hand, in the case of FIG. 6, a current caused to flow into the base of the transistor 9 through the resistor 8-5 may be $1/h_{FE}$ of a collector current of the transistor 9 ($h_{FE}$ represents a current amplification factor of the transistor 9). Accordingly, the loss in the case of FIG. 6 is about one-tenth of that in the case of FIG. 1 when the value of $h_{FE}$ is selected to be 10.

Other embodiments of the present invention will be described hereunder. Although the embodiments described above have no problem in the case where those embodiments are used for supplying power to a normal load having a linear relation between a load voltage and a load current, when those embodiments are used for a load having a constant-voltage characteristic it is necessary to take the following points into consideration.

For example, in a switching power source connected to a load having a constant-voltage characteristic, as disclosed in Japanese Patent Unexamined Publication No. 57-163949, an inductance element is generally connected in series to a main transformer so that a load current is not suddenly changed owing to switching operation. In such a switching power source, an auxiliary power source for a control circuit for driving and controlling the ON-OFF of a switching element can be obtained by rectifying a voltage generated at a winding of several turns provided on the main transformer if the load is kept constant in any conditions. However in the case of a load, such as, a magnetron, in which the load voltage varies in accordance with the operational condition, the auxiliary power source voltage varies in proportion to the change in the load voltage. Such a problem can be prevented in the embodiments described hereunder.

Figure 7:
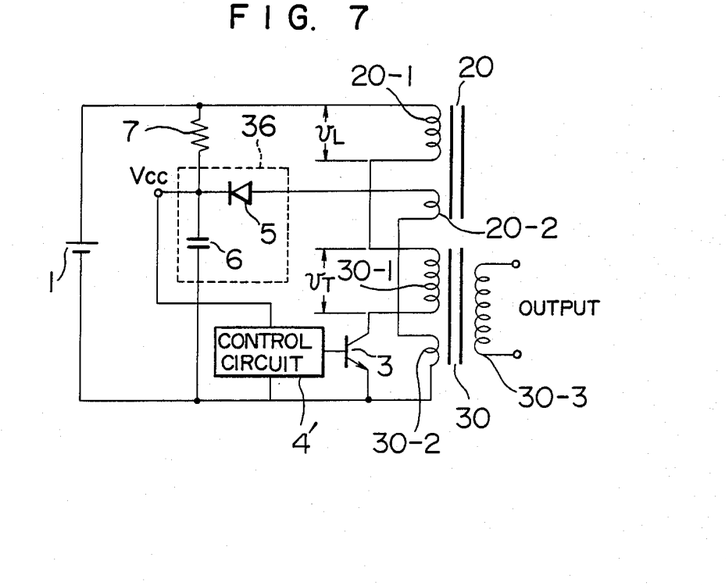
FIG. 7 is a circuit diagram of a fourth embodiment of the present invention.

FIG. 7 is a circuit diagram showing a fourth embodiment of the present invention, in which a series circuit of a main winding 20-1 of an inductance element 20, an input winding 30-1 of a main transformer 30, and a switching element 3 are connected across a DC input power source 1. It is a matter of course that the DC input power source 1 may be that obtained by rectifying a commercial AC power source. A control circuit 4' is connected to the switching element 3 to make switching element 3 perform its switching operation and to control the period of ON-OFF or duty cycle of the switching element 3. Several-turns of winding 20-2 additionally wound on the inductance element 20 and several-turns of secondary winding 30-2 additionally wound on the main transformer 30 are connected in series to each other so as to form an auxiliary power source together with a rectifier circuit 36 to thereby generate an auxiliary power source voltage Vcc through the rectifier circuit 36. An output secondary winding 30-3 is wound on the main transformer 30 at its output side so that power is supplied from the output secondary winding 30-3 to a load connected to the output secondary winding 30-3 directly or through a rectifying and smoothing circuit (not shown).

Figure 8:
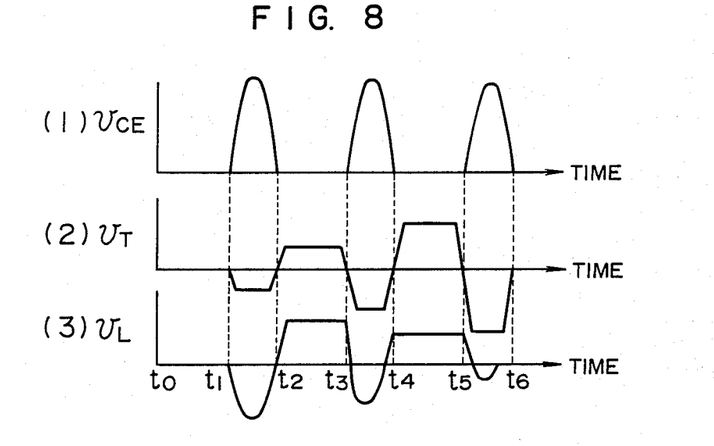
FIG. 8 is a view for explaining the operation of the fourth embodiment.

Referring to FIG. 8, the operation of this embodiment will be described. FIG. 8 is a timing chart in which the diagrams (1), (2), and (3) show the respective waveforms of a voltage $V_{CE}$ applied to the switching element 3, a voltage $V_T$ applied to the main transformer 30, and a voltage $V_L$ applied to the inductance element 20 respectively. FIG. 8 shows the case where the load voltage becomes large as time passes from a point of time $t_0$ to a point of time $t_6$. If only the secondary winding 30-2 of the main transformer 30 is used to form the auxiliary power source, the auxiliary power source can not be made stable because the auxiliary power source voltage Vcc varies in proportion to the respective peak values of the voltage $V_T$ in the periods of $t_2$-$t_3$, $t_4$-$t_5$, etc. in FIG. 8. In this embodiment, however, the voltage $V_L$ applied to the inductance element 20 descends as time passes reversely to the voltage $V_T$. This is because the voltage $V_{CE}$ applied to the switching element 3 is composed of the voltages $V_T$ and $V_L$. Since the winding 30-2 additionally wound for the auxiliary power source on the main transformer 30 is connected in series to the winding 20-2 additionally wound for the auxiliary power source on the inductance element 20, the voltage generated in the series connection of the windings 30-2 and 20-2 is a sum of the respective voltages of the windings 30-2 and 20-2 and is proportional to the voltage $V_{CE}$ applied to the switching element. That is, even if the load voltage varies, the voltage $V_{CE}$ does not vary so much. As a result, the auxiliary power source voltage Vcc proportional to the voltage $V_{CE}$ does not vary so much, so that a stable auxiliary power source can be produced.

Thus, in this embodiment, several turns of additional secondary winding are provided on the main transformer the several turns of additional winding are provided on the inductance element, and those windings are connected in series to each other so as to be used as the winding for the auxiliary power source, so that a stable auxiliary power source can be obtained.

Being illustrated as a bipolar transistor in FIG. 7, the subsidiary switching element may be any other switching element, such as an FET, a thyristor, or the like. Further, being shown in the form of a half-wave rectifying system, the rectifier circuit 36 of the auxiliary power source may be of any other system, such as a full-wave rectifier system, a voltage multiplying rectifier system, or the like.

Figure 9:
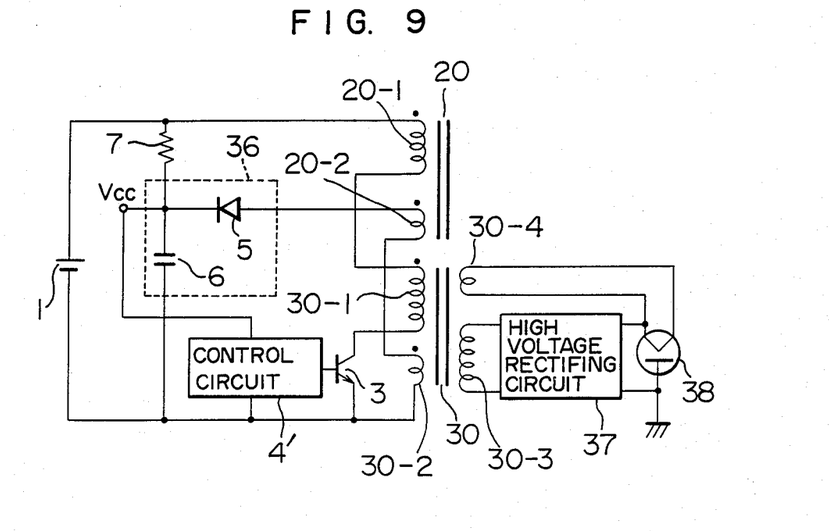
FIG. 9 is a circuit diagram of a fifth embodiment of the present invention.

FIG. 9 shows a fifth embodiment of the present invention in which the present invention is applied to a power source of an inverter system for a magnetron. The input side of the switching power source is the same as that in the case of the fourth embodiment, and the description about it will be omitted. The main transformer 30 has a second output secondary winding 30-4 in addition to the first output secondary winding 30-3. The first output secondary winding 30-3 of the main transformer 30 is connected to a magnetron 38 as an anode power source therefor through a high voltage rectifier circuit 37, and the second output secondary winding 30-4 of the main transformer 30 is connected to a heater of the magnetron 38 as a power source therefor. Although the anode voltage of the magnetron 38 has a constant-voltage characteristic, the operating voltage of the magnetron varies heat of the magnetron per se. If the present invention is applied to such a magnetron, a stable auxiliary power voltage can be obtained through the operation described above.

Figure 10:
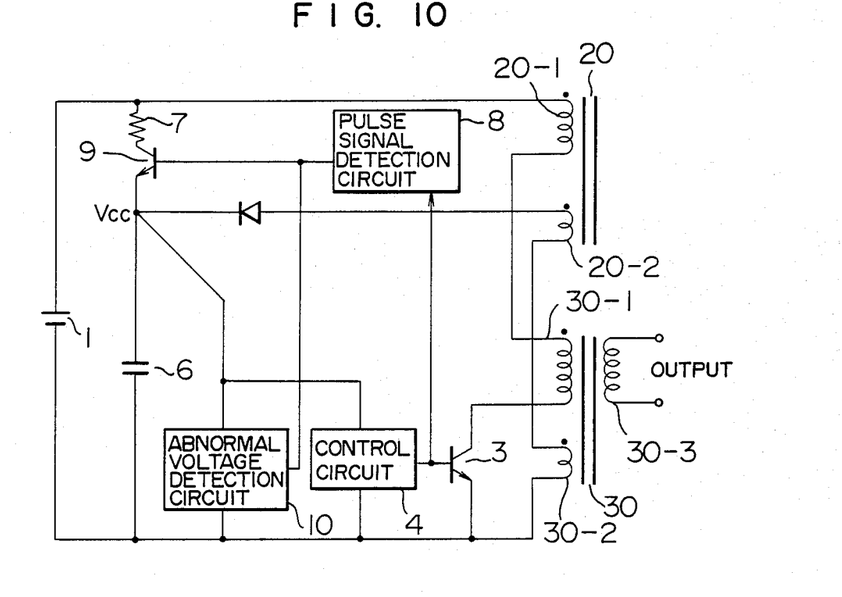
FIG. 10 is a circuit diagram of a sixth embodiment of the present invention.

FIG. 10 shows a sixth embodiment of the present invention. In this embodiment, such a starting circuit having an abnormal voltage detection circuit 10 as shown in FIG. 4 is additionally provided to the embodiment in FIG. 7. The arrangement and operation of this embodiment are apparent from the above description about the foregoing embodiments and therefore the description about the sixth embodiment will be omitted. In this sixth embodiment, it is possible to obtain a switching power source of the type in which an auxiliary power source is supplied from a main transformer, the switching power source having an effect that an auxiliary power source voltage which is stable against variations in an output voltage can be obtained with a simple arrangement, as well as with the effect that starting time is short and power loss in a starting circuit is less. Of course, the embodiment of FIG. 10 can be realized by use of the pulse signal detection circuit 8 and the abnormal voltage detection circuit 10 which are specifically shown in FIG. 6.

What is claimed is:

1. A switching power source comprising:
   a series connection of a main transformer, an inductance element, and a first switching element, said series connection being arranged to be connected to a DC input power source;
   a control circuit means for controlling ON-OFF of said first switching element; and
   an auxiliary power source means including output windings additionally provided on said transformer and said inductance means respectively and connected in series to each other, for supplying an auxiliary power source to said control circuit means.

2. A switching power source according to claim 1, further comprising a starting means connected to said DC input power source and an output of said auxiliary power source means, for supplying power to said control circuit means at least during a starting time of said switching power source.

3. A switching power source according to claim 2, in which said starting means includes a second switching 1 element and a resistor connected in series to said second switching element, said second switching element being controlled so as to close during said starting time.

4. A switching power source according to claim 3, further comprising a detection means for detecting a switching operation of said first switching element to open said second switching element.

5. A switching power source according to claim 3, further comprising a second detection means for detecting an excess of an output voltage of said auxiliary power source means over a predetermined value, and opening said second switching element in response to said detection.

6. A switching power source according to claim 2, in which said starting means includes a resistor connected between said DC input power source and said output of said auxiliary power source means.

7. A switching power source according to claim 1, further comprising connection means for connecting said switching power source to an inverter system for driving a magnetron.

* * * * *

UNITED STATES PATENT AND TRADEMARK OFFICE
CERTIFICATE OF CORRECTION

PATENT NO. : 4,866,590

DATED : September 12, 1989

INVENTOR(S) : Odaka et al.

It is certified that error appears in the above-identified patent and that said Letters Patent is hereby corrected as shown below:

On the title page:

Line [73]: add the following assignees:

-- and Hitachi Device Engineering Co., Ltd.
and Hitachi Nisshin Electronics Co., Ltd. --

Signed and Sealed this

Twenty-first Day of May, 1991

Attest:

HARRY F. MANBECK, JR.

*Attesting Officer*  *Commissioner of Patents and Trademarks*